United States Patent [19]

Hara

[11] Patent Number: 5,215,506
[45] Date of Patent: Jun. 1, 1993

[54] ELECTRONICALLY CONTROLLED DIFFERENTIAL LIMITING SYSTEM

[75] Inventor: Tomoyuki Hara, Hadano, Japan

[73] Assignee: Nissan Motor Co., Ltd., Yokohama, Japan

[21] Appl. No.: 830,419

[22] Filed: Feb. 4, 1992

[30] Foreign Application Priority Data

Feb. 6, 1991 [JP] Japan .................. 3-15306

[51] Int. Cl.⁵ .............................................. F16H 1/44
[52] U.S. Cl. ................................................. 475/86
[58] Field of Search .......................................... 475/86

[56] References Cited

U.S. PATENT DOCUMENTS

| | | | |
|---|---|---|---|
| 3,138,970 | 6/1964 | Costa et al. .................. | 475/86 |
| 3,605,965 | 9/1971 | Thomas et al. ................ | 475/86 X |
| 3,642,103 | 2/1972 | Schott ........................ | 475/86 X |
| 3,974,717 | 8/1976 | Breed et al. .................. | 475/86 |
| 4,583,424 | 4/1986 | von Hiddessen et al. ......... | 475/86 |
| 4,811,628 | 3/1989 | Winkam et al. ................ | 475/86 |
| 4,821,601 | 4/1989 | Ouchi ......................... | 475/86 X |
| 4,841,808 | 6/1989 | Ouchi et al. .................. | 475/86 |

FOREIGN PATENT DOCUMENTS 61-59044 3/1986 Japan .
63-83435 4/1988 Japan .

*Primary Examiner*—Dirk Wright
*Attorney, Agent, or Firm*—Foley & Lardner

[57] ABSTRACT

An electronically controlled differential limiting system comprises a differential case, a differential pinion, a pair of opposing differential side gears respectively splined to left and right axle shafts, a clutch operably provided between the differential case and the side gear, and stepped portions disposed in the differential case, for receiving an engaging force acting to increase engagement between the pinion and the side gear so as to prevent the engaging force from being transmitted to the side gear during application of the clutch, and for receiving a reaction force transmitted from the pinion to the side gears so as to prevent the reaction force from being transmitted to the clutch during rotation of the pinion.

8 Claims, 2 Drawing Sheets

ELECTRONICALLY CONTROLLED DIFFERENTIAL LIMITING SYSTEM

BACKGROUND OF THE INVENTION

1. Field of the Invention

The present invention relates to an electronically controlled differential limiting system, and specifically to a differential limiting system employing a clutch device for preventing wheel spin and loss of traction, even if one wheel encounters a patch of ice or snow and loses traction.

2. Description of the Background Disclosure

Recently, there have been proposed and developed various electronically controlled differential limiting systems for automotive vehicles, which act in an active manner for preventing wheel spin and loss of traction. Such electronically controlled differential limiting systems have been disclosed in Japanese Patent First Publications Tokkai (Showa) 61-59044 and 63-83435. The Japanese Patent First Publication Tokkai (Showa) 61-59044 will be hereinafter referred to as a "first prior art", while the Japanese Patent First Publication Tokkai (Showa) 63-83435 will be hereinafter referred to as a "second prior art". As is generally known, such conventional electronically controlled differential limiting systems include a differential case rotatably supported by bearings in a differential housing, a pair of differential side gears respectively splined to inner ends of axles, at least one differential pinion rotating on its pinion shaft whose ends lie in notches of the differential case, at least one set of clutch device provided between the side gear and the differential case so as to feed additional torque from the differential case through the clutch device to the slower-rotating differential side gear and to return torque from the faster-rotating differential side gear through the clutch device to the differential case, a fluid pressure operated clutch actuating device for engaging and releasing the clutch via fluid pressure. A multiple disc clutch is generally used as the clutch device. The multiple disc clutch has a first series of clutch plates mounted on the differential case and a second series of clutch plates mounted on the side gear. The first and second series of clutch plates are positioned alternately to form a multiple disc clutch. Such conventional differential limiting systems have some problems. With the traditional arrangement of the prior art differential limiting system, when the clutch device is engaged in the differential case, there is a tendency for considerably great pressures to be applied through clutch plates to the differential side gears. The pressure applied to the side gear results in an excessive engagement between the side gear and the meshed differential pinion. That is, such an excessive engagement tends to prevent normal tooth contact between the side gear and the pinion gear. There is another problem that the clutch device tends to receive reaction force transmitted from the differential pinion to the differential side gear when the pinion rotates on its shaft while meshing with the side gear. Such reaction prevents a precise differential limiting control. To avoid the former problem of an undesirable pressure applied to the side gear during operation of the clutch device, the previously noted first prior art differential limiting system includes a pair of symmetrically arranged pressure rings abutting to each other in an axial direction of the wheel axle. The pressure rings are disposed in a limited space defined in the differential case in such a manner as to operably enclose a pair of opposing differential side gears and a differential pinion meshing with the two side gears. The respective pressure ring has both ends facing apart from each other, one end abutting the adjacent pressure ring and the other end mating the innermost clutch plate of the clutch device. In the first prior art differential limiting system, when the left and right clutch devices are engaged, more of great engaging force of the left clutch is not transmitted to the left side gear but converted to pressure applied on the abutting end of the right pressure ring, while more of great engaging force of the right clutch is not transmitted to the right side gear but converted to pressure applied on the abutting end of the left pressure ring. These engaging forces required for application of the respective clutch device can be effectively received on the abutting surface between the adjacent two pressure rings. As set forth above, the first prior art differential limiting system provides an improved construction according to which the differential side gear is unaffected by the engaging force caused by the engagement of the clutch device. However, the arrangement of the first prior art is unsufficient since the first prior art fails to provide means for solving the previously noted latter problem of a reaction transmitted from the differential pinion to the differential side gear during rotational movement of the pinion. To avoid the latter problem, the second prior art differential limiting system has a complicated configuration of a differential case in which the case is formed with a pair of substantially annular projections extending inwardly thereof in a radial direction of the side gear and offsetting to each other by a required distance, so as to rotatably receive each circumferential non-toothed, stepped section of the opposing side gears. In order to provide toothed sections of the opposing differential side gears between the two annular projections spaced apart from each other, the differential case is divided into three pieces firmly secured to each other by means of bolts. Such assembling is troublesome. Furthermore, the construction of the second prior art requires a relatively large number of parts of the differential, with the result that the entire weight of the differential is increased.

In the previously described electronically controlled differential limiting systems, the clutch actuating device is mounted on the differential housing. The clutch actuating device includes a pressure bearing for transmitting pressure necessary to engage the clutch operably disposed in the differential case, while absorbing the rotational speed difference between the housing and the outermost clutch plate receiving the pressure transmitted through the pressure bearing. The traditional pressure bearings are two types, namely a thrust bearing and a radial bearing. It is advantageous that the thrust bearing is utilized as a pressure bearing, since even a relatively small size of thrust bearing can reliably transmit a considerably great clutch-engaging force acting in a thrust direction of the clutch or in an axial direction of the wheel axle. However, in the differential limiting system employing a thrust bearing functioning as a pressure bearing, it is necessary that the thrust bearing is preloaded by means of a spring to prevent slippage occurring between the rolling element and the bearing ring. For example, if the preloading spring is provided between the thrust bearing and the clutch plates in series to the clutch plates, the clutch plates are also preloaded by the spring, with the result that the clutch plates generate an initial friction torque. The initial torque results in deterioration in a differential limiting control precision. With an undesirable arrangement of the preloading spring, there is a tendency for a spring-loaded surface to become damaged due to the rotational speed difference between the end of the spring and the spring-loaded member.

On the other hand, the differential limiting system employing a radial bearing functioning as a pressure bearing, does not require the previously mentioned preloading spring but require a large bearing size to reliably and sufficiently transmit a considerably great clutch-engaging force acting in the thrust direction.

SUMMARY OF THE INVENTION

It is, therefore, in view of the above disadvantages, an object of the present invention to provide an electrically controlled differential limiting system employing a clutch device for actively controlling a differential limiting operation, which can provide a high precision of the differential limiting control by preventing the differential side gear from being affected by a clutch-engaging force created during operation of the clutch and by preventing the clutch device from being unpredictively engaged by a reaction force transmitted from a differential pinion to a differential side gear during rotational movement of the pinion.

It is another object of the invention to provide an electrically controlled differential limiting system employing a clutch device for actively controlling a differential limiting operation and a preloaded pressure bearing for transmitting pressure necessary to engage the clutch, which can provide an optimal location of a preloading element creating a preload for the pressure bearing so as to provide a high reliability and durability of the differential limiting system.

It is a further object of the invention to provide an electrically controlled differential limiting system employing a clutch device for actively controlling a differential limiting operation, which can provide a relatively simple construction of a differential case while providing both a high differential limiting control precision and a high durability of the differential limiting system.

In order to accomplish the aforementioned and other objects, an electronically controlled differential limiting system, comprises a differential case rotatably supported by a differential housing, at least one differential pinion rotating on its pinion shaft mounted on the differential case, a pair of opposing differential side gears provided in the differential case, while meshing with the differential pinion, the differential side gears being respectively splined to axle shafts, a clutch operably provided between the differential case and at least one of the differential side gears, means for applying an engaging force to the clutch, and pressure receiving means disposed in the differential case, for receiving a component of the engaging force acting to increase engagement between the differential pinion and the differential side gear so as to prevent the component from being transmitted to the side gear during application of the clutch, and for receiving a reaction force transmitted from the differential pinion to the differential side gears so as to prevent the reaction force from being transmitted to the clutch during rotation of the pinion.

According to another aspect of the invention, an electronically controlled differential limiting system comprises a differential case rotatably supported by a differential housing, at least one differential pinion rotating on its pinion shaft mounted on the differential case, first and second differential side gears provided in the differential case in such a manner as to oppose to each other, while meshing with the differential pinion, the first and second differential side gears being respectively splined to axle shafts, a first clutch operably provided between the differential case and the first differential side gear, a second clutch operably provided between the differential case and the second differential side gear, means for applying a substantially same amount of engaging force to the first and second clutches, and pressure receiving means disposed in the differential case, for receiving a component of the engaging force acting to increase engagement between the differential pinion and the first differential side gear and a component of the engaging force acting to increase engagement between the differential pinion and the second differential side gear so as to prevent the components from being transmitted to the first and second side gears during applications of the first and second clutches, and for receiving a reaction force transmitted from the differential pinion to the first differential side gear and a reaction force transmitted from the differential pinion to the second differential side gear so as to prevent the reaction forces from being transmitted to the first and second clutches during rotation of the pinion. The pressure receiving means is disposed between the first and second clutches in such a manner as to enclose the differential pinion and the first and second differential side gears. The pressure receiving means is split into two pressure receiving members midway between the first and second differential side gears such that both split ends of the pressure receiving members abut to each other and the other end of the pressure receiving member mates with an inner end of the adjacent clutch. The differential limiting system also includes means provided on the differential case, for restricting outwardly sliding movement of the two-split pressure receiving means. The outwardly sliding movement restricting means may comprise stepped portions formed on the inner wall of the differential case, so as to transmit the reaction forces to the differential case.

According to a further aspect of the invention, an electronically controlled differential limiting system comprises a differential case rotatably supported by a differential housing, at least one differential pinion rotating on its pinion shaft mounted on the differential case, a pair of opposing differential side gears provided in the differential case, while meshing with the differential pinion, the differential side gears being respectively splined to axle shafts, a clutch operably provided between the differential case and at least one of the differential side gears, means for applying an engaging force to the clutch, through a pressure bearing comprising of a thrust bearing and a pressure plate being arranged in series to the pressure bearing in such a manner as to come into contact with the clutch so as to transmit the engaging force to the clutch, and means disposed between the side gear and the pressure plate, for preloading the pressure bearing.

According to a still further aspect of the invention, an electronically controlled differential limiting system comprises a differential case rotatably supported by a differential housing, at least one differential pinion rotating on its pinion shaft mounted on the differential case, first and second differential side gears provided in the differential case in such a manner as to oppose to each other, while meshing with the differential pinion, the first and second differential side gears being respectively splined to axle shafts, first and second clutch hubs respectively fitted to the outer ends of the first and second side gears, the first and second clutch hubs being respectively splined to the axle shafts, a first clutch operably provided between the differential case and the first clutch hub, a second clutch operably provided between the differential case and the second clutch hub, means for applying a substantially same amount of engaging force to the first and second clutches. The engaging force applying means includes a first clutch applying means associated with the first clutch through a first pressure bearing comprising of a thrust bearing and a first pressure plate being arranged in series to the first pressure bearing in such a manner as to come into contact with the first clutch, and a second clutch applying means associated with the second clutch through a second pressure bearing comprising of a thrust bearing and a second pressure plate being arranged in series to the second pressure bearing in such a manner as to come into contact with the second clutch. The differential limiting system also includes a first spring means for disposed between the first clutch hub and the first pressure plate, for preloading the first pressure bearing, and a second spring means for disposed between the second clutch hub and the second pressure plate, for preloading the second pressure bearing. The differential limiting system may further comprises pressure receiving means disposed in the differential case, for receiving a component of the engaging force acting to increase engagement between the differential pinion and the first differential side gear and a component of the engaging force acting to increase engagement between the differential pinion and the second differential side gear so as to prevent the components from being transmitted to the first and second side gears during applications of the first and second clutches, and for receiving a reaction force transmitted from the differential pinion to the first differential side gear and a reaction force transmitted from the differential pinion to the second differential side gear so as to prevent the reaction forces from being transmitted to the first and second clutches during rotation of the pinion, the pressure receiving means being disposed between the first and second clutches in such a manner as to enclose the differential pinion and the first and second differential side gears, the pressure receiving means being split into two pressure receiving members midway between the first and second differential side gears such that both split ends of the pressure receiving members abut to each other and the other end of each pressure receiving member mates with both inner ends of the adjacent clutch and the adjacent clutch hub. In addition to the above, the pressure receiving means may simultaneously receive reaction forces created by the first and second spring means at the abutting surface thereof so as to prevent the reaction forces of the spring means from transmitting through the clutch hubs to the differential side gears.

DESCRIPTION OF THE PREFERRED EMBODIMENT

Figure 1:
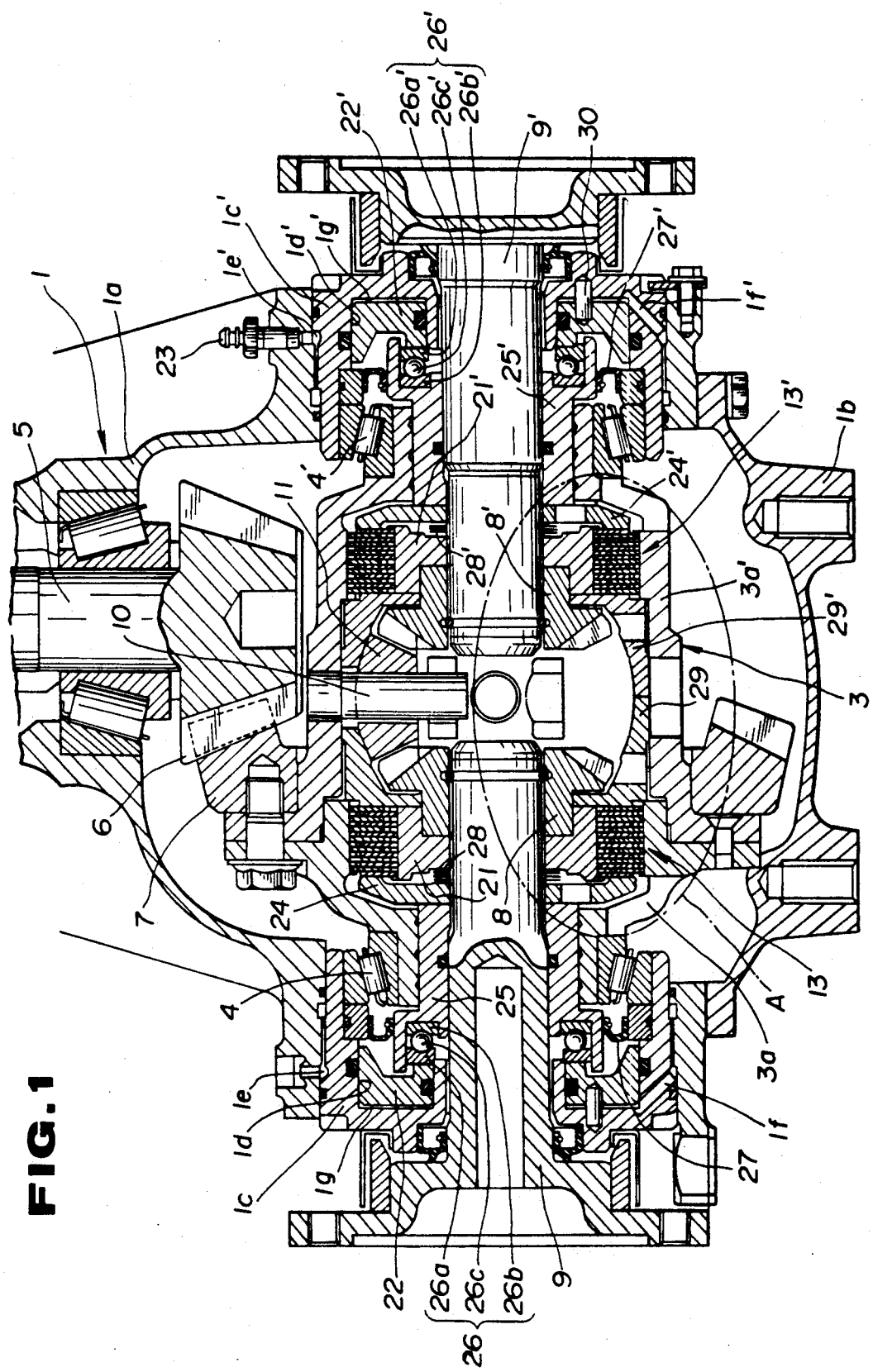
FIG. 1 is a schematic cross-sectional view illustrating a preferred embodiment of an electronically controlled differential limiting system according to the invention.

Referring now to the drawings, particularly to FIG. 1, there is shown an electronically controlled differential limiting system according to the invention, assembled to a differential housing 1 of a differential for an automotive vehicle. The differential housing 1 is firmly secured to a vehicle body by means of stud bolts (not shown). The housing 1 is comprised of a front housing 1a, a rear housing 1b, and left and right piston housings 1c and 1c'. A differential case 3 is operatingly enclosed in the housing 1 in such a manner as to be rotatably supported by means of left and right taper-roller bearings 4 and 4'. As clearly shown in FIG. 1, the differential case 3 is comprised of left and right halves 3a and 3a'. The outer race of the left taper-roller bearing 4 is press-fitted into an inner bore defined in the piston housing 1c, while the inner race of the left taper-roller bearing 4 is press-fitted into a leftmost outer cylindrical section of the left half 3a. In a manner similar to the taper-roller bearing 4 discussed above, the outer race of the right taper-roller bearing 4' is press-fitted into an inner bore defined in the piston housing 1c', while the inner race of the right taper-roller bearing 4' is press-fitted into a rightmost outer cylindrical section of the right half 3a'. A ring gear 7 is firmly secured to the flange on the left half 3a' by means of bolts such that the halves 3a and 3a' and the ring gear 7 are assembled to each other. The ring gear 7 which is generally referred to as an "axle drive gear", is meshed with a drive pinion 6 fixed onto the end of a propeller shaft 5 having a driven connection with a transmission output shaft (not shown). In this construction, the differential case rotates with the ring gear 7 when the latter is driven by the drive pinion 6. Each vehicle wheel has a separate wheel axle. There are two differential side gears 8 and 8' splined to the inner ends of the left and right wheel axle shafts 9 and 9' and arranged in such a manner as to be opposed to each other in the differential case 3. Fitted into the right half 3a' of the differential case is a differential pinion shaft 10 on which are assembled a differential pinion 11 meshed with both side gears 8 and 8'. Traditionally, the respective gears 8, 8', and 11 are bevel gears. When the three bevel gears are meshed together, the differential pinion shaft and the axle shaft are arranged at a 90-degree angle. Thus, when the differential case 3 is rotated, both side gears 8 and 8' rotate and consequently both wheels rotate. Assuming that one wheel is held stationary, the differential pinion 11 will also rotate as it runs round on the stationary side gear, when the differential case is rotated through the ring gear 7 by the drive pinion 6. In this manner, the differential pinion 11 carries rotary motion to the other side gear, thereby causing the other side gear to rotate. As set forth above, in a standard differential for an automotive vehicle, all the rotating effort goes from the stationary wheel to the other wheel. To avoid this and to provide good traction, the differential assembly which employs the electronically controlled differential limiting system, includes left and right friction clutch devices 13 and 13'. The friction clutch device is conventionally comprised of a multiple disc clutch. As seen in FIG. 1, the left clutch device 13 is provided between the left side gear 8 and the left half 3a, while the right clutch device 13' is provided between the right side gear 8' and the right half 3a'. As clearly shown in FIG. 2, the left multiple disc clutch 13 has a first series of clutch plates 13a fixed onto the left half 3a of the differential case and a second series of clutch plates 13b fixed onto a left hub 21. The left clutch hub 21 is fitted to the outer cylindrical section of the left side gear 8 and splined to the inner end of the left axle shaft 9. On the other hand, the right multiple disc clutch 13' has a first series of clutch plates 13a' fixed onto the right half 3a' and a second series of clutch plates 13b' fixed onto a right hub 21' which is fitted to the outer cylindrical section of the right side gear 8' and splined to the inner end of the right axle shaft 9'. The first and second series of clutch plates are positioned alternately to form a multiple disc clutch. Reference numerals 22 and 22' respectively designate left and right hydraulically operated pistons. The pistons 22 and 22' are slidably enclosed in the cylindrical sections 1d and 1d' respectively formed in the piston housings 1c and 1c'. A left pressure chamber 1g is defined between the outer end of the left piston 22 and the bottom wall of the cylindrical section 1d, while a right pressure chamber 1g' is defined between the outer end of the right piston 22' and the bottom wall of the cylindrical section 1d'. As clearly seen in the left hand of FIG. 1, a controlled fluid pressure is supplied from a fluid-pressure source such as an oil pump through a nipple 23, an oil groove 1e' formed in the circumferential portion of the piston housing, and a fluid passage 1f' formed in the piston housing in such a manner as to expose to the oil groove 1e', to the right pressure chamber 1g', in that order. Likewise, in the right hand of FIG. 1, the controlled fluid pressure is supplied from the fluid-pressure source through the oil nipple, the oil groove 1e, and the fluid passage 1f to the left pressure chamber 1g. In a conventional manner, the controlled fluid pressure is applied to the pistons 22 and 22' in response to a control signal generated by a control unit (not shown), depending on various driving conditions, such as a road surface condition, for example wet, icy, or snow roads and a dry pavement. The controlled pressure corresponds to an engaging force for application of the clutch. In order to transmit the controlled pressure from the piston to the clutch, a series of pressure transmitting elements are provided between the piston and the clutch. In the left-hand of FIG. 1, the pressure transmitting elements are comprised of a pressure plate 24, a pressure sleeve 25, and a pressure bearing 26. In the right-hand of FIG. 1, the pressure transmitting elements are comprised of a pressure plate 24', a pressure sleeve 25', and a pressure bearing 26'. The pressure plate 24 is splined to the associated wheel axle shaft 9 in such a manner as to axially slide between the left clutch hub 21 and the pressure sleeve 25, as shown in the left-hand of FIG. 1, while the pressure plate 24' is splined to the wheel axle shaft 9' in such a manner as to axially slide between the right clutch hub 21' and the pressure sleeve 25'. The innermost end of the pressure plate comes into contact with the outermost end of the multiple disc clutch to achieve application of the clutch. In these constructions, the pressure plate and the associated axle shaft rotate together. The pressure sleeve is slidably fitted onto the outer periphery of the axle shaft in such a manner as to come into contact with the outer end of the pressure plate. In the embodiment, a thrust bearing is used as the pressure bearing. The thrust bearing 26 is comprised of a pair of bearing rings 26a and 26b and a plurality of rolling elements 26c rotatably disposed between the bearing rings 26a and 26b, while the thrust bearing 26' is comprised of a pair of bearing rings 26a' and 26b' and a plurality of rolling elements 26c' rotatably disposed between the bearing rings 26a' and 26b'. As shown in FIG. 1, the thrust bearing is coaxially arranged with regard to the wheel axle shaft. The thrust bearing (26, 26') acting as the pressure bearing is operably sandwiched between the piston (22, 22') and the pressure sleeve (25, 25') so as to transmit the pressure applied to the piston, while absorbing the rotational speed difference between the differential housing and the pressure sleeve fitted onto the axle shaft. An oil seal (27, 27') is arranged to separate working fluid chamber defined in the cylindrical section (1d, 1d') from the other space defined in the housing 1 such that the oil seal substantially overlaps with the thrust bearing in the radial direction of the latter. Due to such overlapping, the entire axial length of the differential assembly can be slightly shortened.

The differential limiting system according to the invention also includes means for preloading the thrust bearing in its axial direction so as to prevent slippage occurring between the rolling element and the bearing ring. In the preferred embodiment, the preloading means is comprised of a spring (28, 28') provided between the clutch hub and the pressure plate in such a manner as to operably enclose the outer periphery of the axle shaft. In the embodiment, each of the preloading springs 28 and 28' is comprised of a coil spring. Reference numeral 30 is a pin for allowing the sliding movement of the piston and for preventing the relative rotary movement of the piston with regard to the piston housing.

Figure 2:
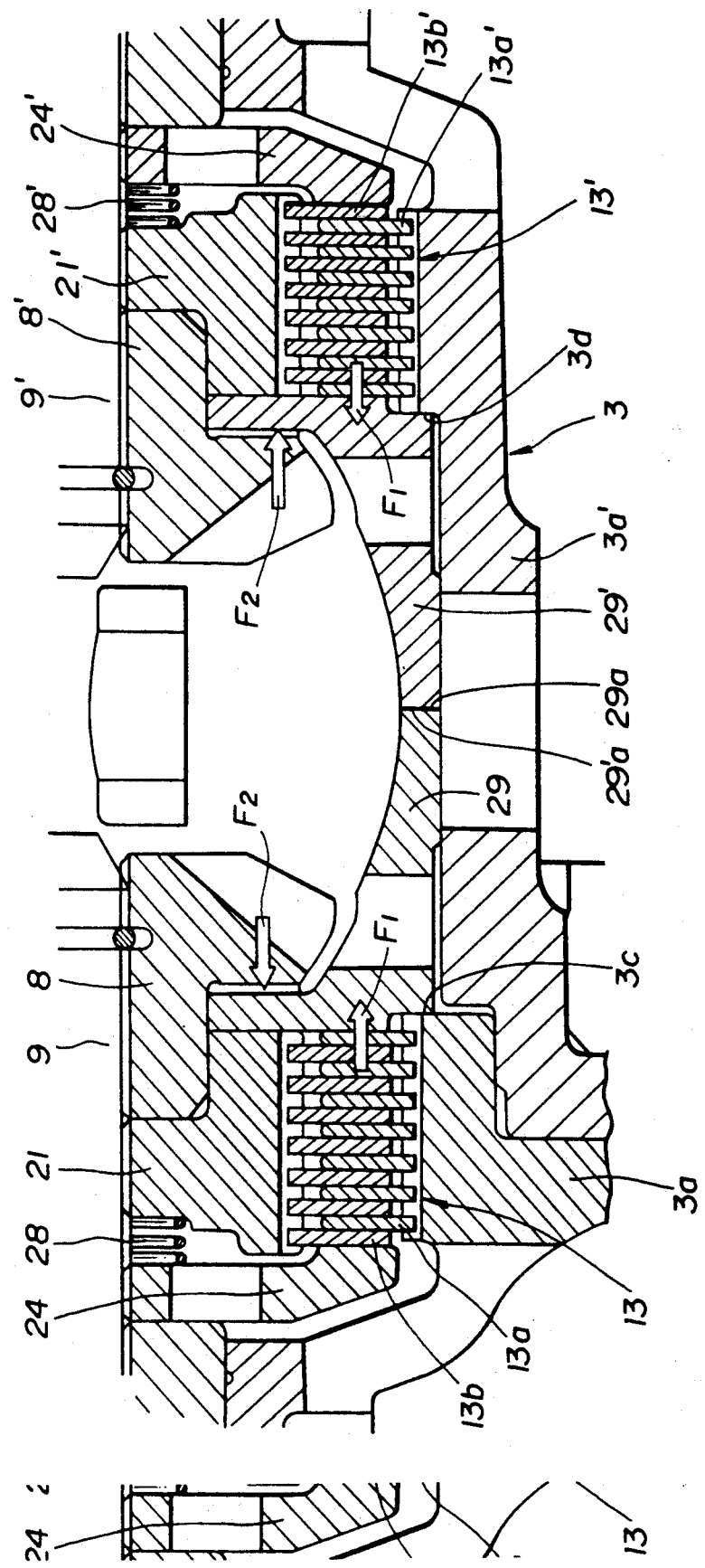
FIG. 2 is a partially enlarged cross-sectional view illustrating a partial section A of FIG. 1.

The differential limiting system of the invention also includes a pair of symmetrically arranged pressure rings 29 and 29' abutting to each other in the axial direction of the wheel axle shaft. The pressure rings are disposed in a limited space defined in the differential case 3 in such a manner as to enclose the opposing differential side gears 8 and 8' and the differential pinion 11. As clearly shown in FIG. 2, one end 29a of the left pressure ring 29 abuts one end 29a' of the right pressure ring 29'. The other end of the left pressure ring 29 mates with the innermost clutch plate of the left clutch 13, while the other end of the right pressure ring 29' mates with the innermost clutch plate of the right clutch 13'. The outermost annular section of the pressure ring is slidably fitted into a space defined between the jaw-like portion of the side gear and the innermost end of the clutch hub. As shown in FIG. 2, there is a slight aperture between the above annular section of the pressure ring and the side gear so as to permit the pressure ring to slide in the axial direction. As indicated by the arrows of FIG. 2, when the left and right clutches 13 and 13' are applied, more of engaging force $F_1$ of the left clutch 13 is applied and received on the abutting end 29a of the right pressure ring 29' before the force $F_1$ is transmitted to the left side gear 8, while more of engaging force $F_1$ of the right clutch 13' is applied and received on the abutting end 29a' of the left pressure ring 29 before the force $F_1$ is transmitted to the right side gear 8'. That is, the opposing engaging forces generated during applications of the left and right clutches are balanced to each other on the abutting surface between both split ends 29a and 29a'. In this manner, the inwardly sliding movement of one pressure ring is restricted by the abutting end of the adjacent pressure ring. As appreciated from the above, since each side gear is unaffected by the same amount of engaging force necessary to apply the clutches, the differential assembly is a long life and in addition a higher precision of the differential limiting control is achieved.

Note that the outwardly sliding movement of the left pressure ring 29 is restricted by a stepped portion 3c defined in the differential case 3, while the outwardly sliding movement of the right pressure ring 29' is restricted by a stepped portion 3d defined in the differential case 3. When the side gears are moved outwards by reaction forces $F_2$, which are indicated by the arrows of FIG. 2, transmitted from the differential pinion to each side gear during rotation of the differential pinion, the two pressure rings 29 and 29' are slightly expanded outwards in accordance with the outwardly sliding movement of each side gear. In case of the previously described first prior art, the reaction force $F_2$ is transmitted through the pressure ring to the multiple disc clutch, with the result that the clutch plates are slightly engaged to each other. However, in case of the differential limiting system according to the invention, the reaction force $F_2$ is not transmitted to the clutch but transmitted through the pressure ring to the stepped portion of the differential case 3. In other words, the above-mentioned reaction force created during rotation of the differential pinion is finally absorbed by the differential case 3. As set forth above, since the clutch device is unaffected by the reaction force created during rotation of the differential pinion, the differential limiting control precision is enhanced.

The operation of the differential limiting system according to the invention is described hereinafter described in detail.

During a straight-ahead driving on express-highway, or when one wheel slips on an excessively low frictional road, such as a muddy road, icy or snow roads, the differential limiting system is activated and therefore the same amount of controlled pressure is applied to each pressure chamber 1g and 1g'. Each fluid-pressure operated piston 22 and 22' is then moved inwardly of the differential case 3 for applying the clutches 13 and 13'. During a straight-ahead driving, when there is no speed difference between left and right driven wheels, the same amount of torque is delivered through the drive pinion 6, the ring gear 7, the differential pinion shaft 10, the differential pinion 11, and the opposing differential side gears 8 and 8' to each axle shaft 9 and 9'. Under this condition, when one wheel slips on a low frictional road surface, such as a patch of ice or snow, the clutch devices 13 and 13' act to prevent loss of traction such that a portion of torque of the faster-rotating differential side gear, i.e., the faster-rotating driven wheel corresponding to the slipping less-traction wheel is returned to the slower-rotating differential side gear, i.e., the slower-rotating driven wheel corresponding to the non-slipping greater-traction wheel. Such differential limiting action prevents a rapid loss of traction and consequently enhances a driving stability of the vehicle. In this manner, the differential limiting system according to the invention acts to effectively provide a good traction irrespective of the road surface condition, such that the system delivers maximum torque to the wheel with maximum traction and delivers minimum torque to wheel with minimum traction. As appreciated from the above, such differential limiting action facilitates an escape of the vehicle from a muddy spot, even when one wheel is slipping on the muddy road.

In the differential limiting system according to the invention, since each preloading spring 28 and 28' is provided between the clutch hub and the pressure plate, both splined to the axle shaft, the preloading spring, the clutch hub and the pressure plate rotate together. As a result, there are no relative speed differences between two abutting surfaces, namely a first abutting surface defined between the inner end of the pressure plate and the outer end of the spring and a second abutting surface defined between the outer end of the clutch hub and the inner end of the spring. Such an arrangement of the preloading spring prevents abrasion or scuffing at the previously noted abutting surfaces. To clearly distinguish the superior arrangement of the preloading spring according to the embodiment from various conventional arrangements, some undesirable arrangements are hereinafter exemplified.

As discussed in the prior art disclosure, assuming that the preloading spring and the multiple-disc friction clutch are arranged in series to each other, for example when at least one of the clutch plates is replaced by a diaphragm type spring functioning as a preloading spring, the clutch plates are preloaded by the diaphragm spring, thereby resulting in an initial friction torque on the spring-loaded clutch, even when the differential limiting system is inoperative and the clutch plates are positioned in an initial position, i.e., a clutch release position. When the preloading spring is provided between the fluid-pressure operated piston and its piston housing in the same manner as discussed above, the clutch can be preloaded. Supposing that the preloading spring is provided between the differential case and either the pressure plate or the pressure sleeve, the preloading spring is arranged in parallel with the clutch and therefore the clutch cannot be preloaded. However, since there is the relative rotational speed difference between the differential case and the pressure plate or between the differential case and the pressure sleeve, such a parallel arrangement may result in abrasion at the spring-loaded pressure surfaces abutting both ends of the preloading spring.

In case of a preloading-spring arrangement according to the preferred embodiment, since the preloading spring is arranged in parallel with regard to the clutch and provided between the pressure plate and the clutch hub, both members having the same rotational speed, the clutch is unaffected by the preloading spring and there is no abrasion at pressure surfaces abutting both ends of the preloading spring. Therefore, the differential limiting system can provide a superior precision of the differential limiting control and a high durability of the differential limiting system. Furthermore, with the arrangement of the preloading spring according to the invention, since the pressure rings 29 and 29' receive reaction forces created by a pair of preloading springs 28 and 28' at the abutting surface of the two-split pressure rings so as to prevent the reaction forces from transmitting through the clutch hubs 21 and 21' to the differential side gears 8 and 8', optimal tooth contacts between the differential pinion and the meshing side gears can be held.

Although a fluid-pressure operated piston is utilized to apply a multiple disc clutch in the embodiment, the other clutch engaging device, such as a mechanically operated piston may be utilized.

In the preferred embodiment since left and right multiple disc clutches are symmetrically arranged between a differential case and left and right differential side gears, friction torques can be transmitted between the differential case and each side gear with an extremely high transmission efficiency, during operation of the differential limiting system. Alternatively, a single clutch device may be provided between a differential case and one of differential side gears so as to transmit the previously noted friction torques. In the latter case, the transmission rate in friction torque is slightly lowered when compared with the former case.

While the foregoing is a description of the preferred embodiments for carrying out the invention, it will be understood that the invention is not limited to the particular embodiments shown and described herein, but that various changes and modifications may be made without departing from the scope or spirit of this invention as defined by the following claims.

What is claimed is:

1. An electronically controlled differential limiting system comprising:
   a differential case rotatably supported by a differential housing;
   at least one differential pinion rotating on its pinion shaft mounted on said differential case;
   a pair of opposing differential side gears provided in said differential case, for meshing with said differential pinion, said differential side gears being respectively splined to axle shafts;
   a clutch operably provided between said differential case and at least one of said differential side gears;
   means for applying an engaging force to said clutch;
   pressure receiving means disposed in said differential case, for receiving a component of said engaging force acting to increase engagement between said differential pinion and said differential side gear so as to prevent said component from being transmitted to said side gear during application of said clutch, and for receiving a reaction force transmitted from said differential pinion to said differential side gears so as to prevent said reaction force from being transmitted to said clutch during rotation of said pinion; and
   said pressure receiving means including two-split pressure receiving members, each having an inner abutment portion provided for restricting inwardly sliding movement of said pressure receiving members and for receiving said component of said engaging force through said inner abutment portion, and on outer abutment portion cooperating with a stepped portion defined in said differential case for restricting outwardly sliding movement of said pressure receiving members and for transmitting said reaction force through said outer abutment portion and said stepped portion to said differential case.

2. An electronically controlled differential limiting system comprising:
   a differential case rotatably supported by a differential housing;
   at least one differential pinion rotating on its pinion shaft mounted on said differential case;
   first and second differential side gears provided in said differential case in such a manner as to oppose to each other, while meshing with said differential pinion, said first and second differential side gears being respectively splined to axle shafts;
   a first clutch operably provided between said differential case and said first differential side gear;
   a second clutch operably provided between said differential case and said second differential side gear;
   means for applying a substantially same amount of engaging force to said first and second clutches;
   pressure receiving means disposed in said differential case, for receiving a component of said engaging force acting to increase engagement between said differential pinion and said first differential side gear and a component of said engaging force acting to increase engagement between said differential pinion and said second differential side gear so as to prevent said components from being transmitted to said first and second side gears during applications of said first and second clutches, and for receiving a reaction force transmitted from said differential pinion to said first differential side gear and a reaction force transmitted from said differential pinion to said second differential side gear so as to prevent said reaction forces from being transmitted to said first and second clutches during rotation of said pinion;
   said pressure receiving means being disposed between said first and second clutches in such a manner as to enclose said differential pinion and said first and second differential side gears, said pressure receiving means being split into two pressure receiving members midway between said first and second differential side gears such that both split ends of said pressure receiving members abut to each other and the other end of said pressure receiving member mates with an inner end of the adjacent clutch; and
   means provided on said differential case, for restricting outwardly sliding movement of said two-split pressure receiving means.

3. The differential limiting system as set forth in claim 2, wherein said outwardly sliding movement restricting means comprises stepped portions formed on the inner wall of said differential case, so as to transmit said reaction forces to said differential case.

4. An electronically controlled differential limiting system comprising:
   a differential case rotatably supported by a differential housing;
   at least one differential pinion rotating on its pinion shaft mounted on said differential case;
   a pair of opposing differential side gears provided in said differential case, for meshing with said differential pinion, said differential side gears being respectively splined to axle shafts;
   a clutch operably provided between said differential case and at least one of said differential side gears;
   means for applying an engaging force to said clutch, through a pressure bearing comprised of a thrust bearing and a pressure plate splined to the associated axle shaft in series with said pressure bearing in such a manner as to come into contact with said clutch so as to transmit said engaging force to said clutch;
   means disposed between said side gear and said pressure plate both splined to the associated axle shaft, for preloading said pressure bearing and;
   said preloading means being arranged in parallel with said clutch.

5. An electronically controlled differential limiting system comprising:
   a differential case rotatably supported by a differential housing;
   at least one differential pinion rotating on its pinion shaft mounted on said differential case;
   first and second differential side gears provided in said differential case in such a manner as to oppose to each other, while meshing with said differential pinion, said first and second differential side gears being respectively splined to axle shafts;

first and second clutch hubs respectively fitted to outer ends of said first and second side gears, said first and second clutch hubs being respectively splined to said axle shafts;

a first clutch operably provided between said differential case and said first clutch hub;

a second clutch operably provided between said differential case and said second clutch hub;

means for applying a substantially same amount of engaging force to said first and second clutches;

said engaging force applying means including a first clutch applying means associated with said first clutch through a first pressure bearing comprised of a thrust bearing and a first pressure plate being arranged in series to said first pressure bearing in such a manner as to come into contact with said first clutch, and a second clutch applying means associated with said second clutch through a second pressure bearing comprised of a thrust bearing and a second pressure plate being arranged in series to said second pressure bearing in such a manner as to come into contact with said second clutch;

a first preloading means disposed between said first clutch hub and said first pressure plate, for preloading said first pressure bearing; and a second preloading means disposed between said second clutch hub and said second pressure plate, for preloading said second pressure bearing.

6. The differential limiting system as set forth in claim 5, further comprising pressure receiving means disposed in said differential case, for receiving a component of said engaging force acting to increase engagement between said differential pinion and said first differential side gear and a component of said engaging force acting to increase engagement between said differential pinion and said second differential side gear so as to prevent said components from being transmitted to said first and second side gears during applications of said first and second clutches, and for receiving a reaction force transmitted from said differential pinion to said first differential side gear and a reaction force transmitted from said differential pinion to said second differential side gear so as to prevent said reaction forces from being transmitted to said first and second clutches during rotation of said pinion; and said pressure receiving means being disposed between said first and second clutches in such a manner as to enclose said differential pinion and said first and second differential side gears, said pressure receiving means being split into two pressure receiving members midway between said first and second differential side gears such that both split ends of said pressure receiving members abut to each other and the other end of each pressure receiving member mates with both inner ends of the adjacent clutch and the adjacent clutch hub;

7. The differential limiting system as set forth in claim 6, wherein said pressure receiving means receives reaction forces created by said first and second preloading means at the abutting surface thereof so as to prevent said reaction forces of said spring means from transmitting through said clutch hubs to said differential side gears.

8. The differential limiting system as set forth in claim 7, wherein said preloading means comprises a compression spring arranged around an outer periphery of said axle shaft.

* * * * *